US012755957B2

(12) United States Patent
Kim et al.

(10) Patent No.: US 12,755,957 B2
(45) Date of Patent: Oct. 6, 2026

(54) ELECTRODE MANUFACTURING AND DRYING APPARATUS AND METHOD

(71) Applicant: LG Energy Solution, Ltd., Seoul (KR)

(72) Inventors: Ji Hwan Kim, Daejeon (KR); Oh Cheol Kwon, Daejeon (KR); Soon Sik Choi, Daejeon (KR); Jeongwon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 591 days.

(21) Appl. No.: 18/270,048

(22) PCT Filed: Nov. 17, 2022

(86) PCT No.: PCT/KR2022/018238

§ 371 (c)(1),
(2) Date: Jun. 28, 2023

(87) PCT Pub. No.: WO2023/090912

PCT Pub. Date: May 25, 2023

(65) Prior Publication Data

US 2024/0072236 A1 Feb. 29, 2024

(30) Foreign Application Priority Data

Nov. 18, 2021 (KR) ........................ 10-2021-0159461

(51) Int. Cl.
*H01M 4/04* (2006.01)
*F26B 21/33* (2026.01)

(52) U.S. Cl.
CPC ........... *H01M 4/0471* (2013.01); *F26B 21/33* (2026.01); *H01M 4/0404* (2013.01)

(58) Field of Classification Search
CPC .... H01M 4/0471; H01M 4/0404; F26B 21/33
See application file for complete search history.

(56) References Cited

U.S. PATENT DOCUMENTS

2012/0005917 A1 1/2012 Jung et al.
2014/0014037 A1 1/2014 Watanabe et al.
(Continued)

FOREIGN PATENT DOCUMENTS

CN 104344707 A 2/2015
CN 212856488 U * 4/2021
(Continued)

OTHER PUBLICATIONS

CN_212856488 Translation (Year: 2021).*
(Continued)

*Primary Examiner* — Jimmy Vo
(74) *Attorney, Agent, or Firm* — Lerner David LLP

(57) ABSTRACT

An electrode manufacturing apparatus includes a supply part to supply an electrode precursor, a drying part to dry the electrode slurry, an air supply part to supply high-temperature vapor, an air introducing part to introduce the supplied high-temperature vapor, a flow path connected from the air introducing part to the air supply part, a sensor to measure humidity, an air discharge part, and a humidifying part to humidify the high-temperature vapor. The apparatus further includes a discharge part to discharge the manufactured electrode, a monitoring part, and a control part to collect monitoring information and information on the humidity to control whether to open or close the air discharge part and a degree of humidification by the humidifying part. An electrode manufacturing method using the apparatus thereof.

6 Claims, 5 Drawing Sheets

(56) References Cited

U.S. PATENT DOCUMENTS

| | | | |
|---|---|---|---|
| 2017/0276429 | A1 | 9/2017 | Heo et al. |
| 2019/0229324 | A1 | 7/2019 | Woo et al. |
| 2020/0240915 | A1 | 7/2020 | Son et al. |
| 2021/0175568 | A1 | 6/2021 | Geshi et al. |
| 2022/0276001 | A1 | 9/2022 | Kim |

FOREIGN PATENT DOCUMENTS

| | | | | |
|---|---|---|---|---|
| EP | 2808635 | A1 | 12/2014 | |
| JP | H0214772 | A | 1/1990 | |
| JP | H0441765 | A | 2/1992 | |
| JP | 2000106175 | A | 4/2000 | |
| JP | 2002273308 | A | 9/2002 | |
| JP | 2008103098 | A | 5/2008 | |
| JP | 201180718 | A | 4/2011 | |
| JP | 2013064516 | A | 4/2013 | |
| JP | 5392332 | B2 * | 1/2014 | ............ H01M 4/661 |
| JP | 5766054 | B2 | 8/2015 | |
| JP | 202027828 | A | 2/2020 | |
| KR | 20130043073 | A | 4/2013 | |
| KR | 20150131561 | A | 11/2015 | |
| KR | 20160009840 | A | 1/2016 | |
| KR | 20170109912 | A | 10/2017 | |
| KR | 20180079841 | A | 7/2018 | |
| KR | 20190019828 | A | 2/2019 | |
| KR | 20190029305 | A | 3/2019 | |
| KR | 20190084470 | A | 7/2019 | |
| KR | 20210050721 | A * | 5/2021 | ................ F26B 3/12 |
| KR | 20210123792 | A | 10/2021 | |
| WO | 2013039005 | A1 | 3/2013 | |
| WO | 2013111647 | A1 | 8/2013 | |
| WO | 2021020774 | A1 | 2/2021 | |

OTHER PUBLICATIONS

JP_5392332_B2 Translation (Year: 2014).*

KR_20210050721_A Translation (Year: 2021).*

International Search Report for PCT/KR2022/018238 mailed Mar. 8, 2023. 3 pages.

Extended European Search Report including Written Opinion for Application No. 22896109.0 dated Jun. 17, 2024, pp. 1-9.

Search Report dated Jun. 5, 2026 from the Office Action for Chinese Application No. 202280008943.1 issued Jun. 8, 2026. 3 pgs.

* cited by examiner

[FIG. 1]
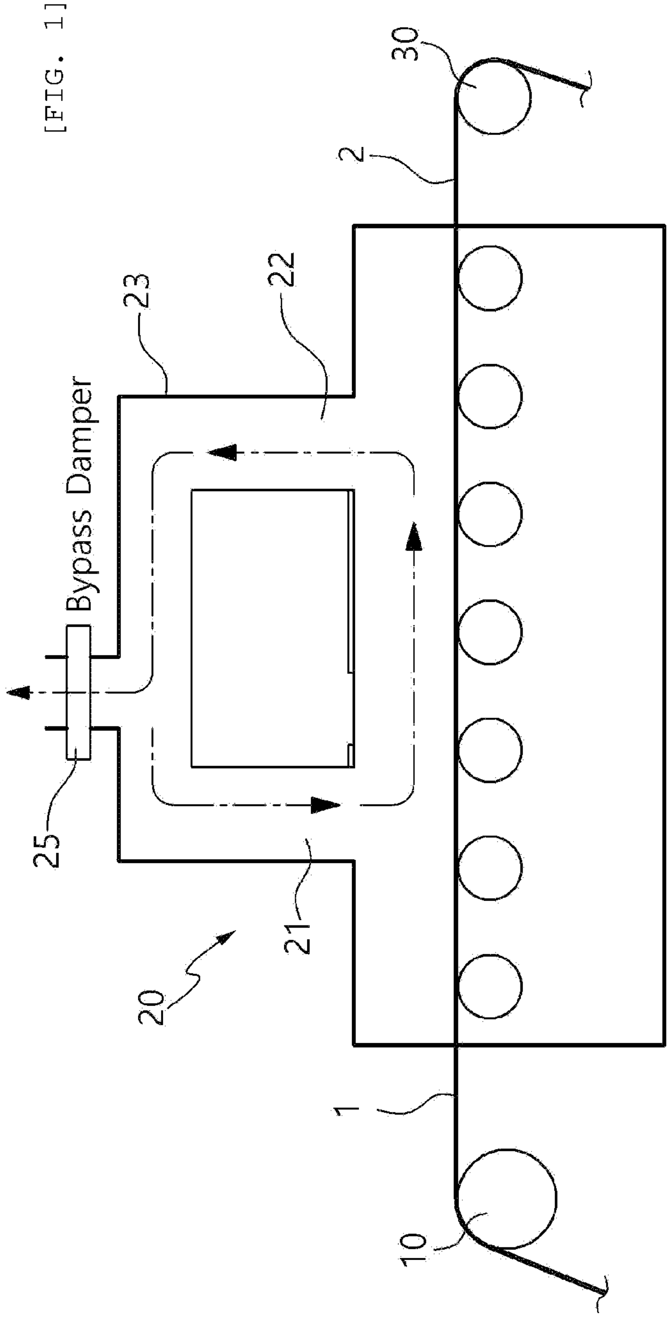
Prior Art

[FIG. 2]
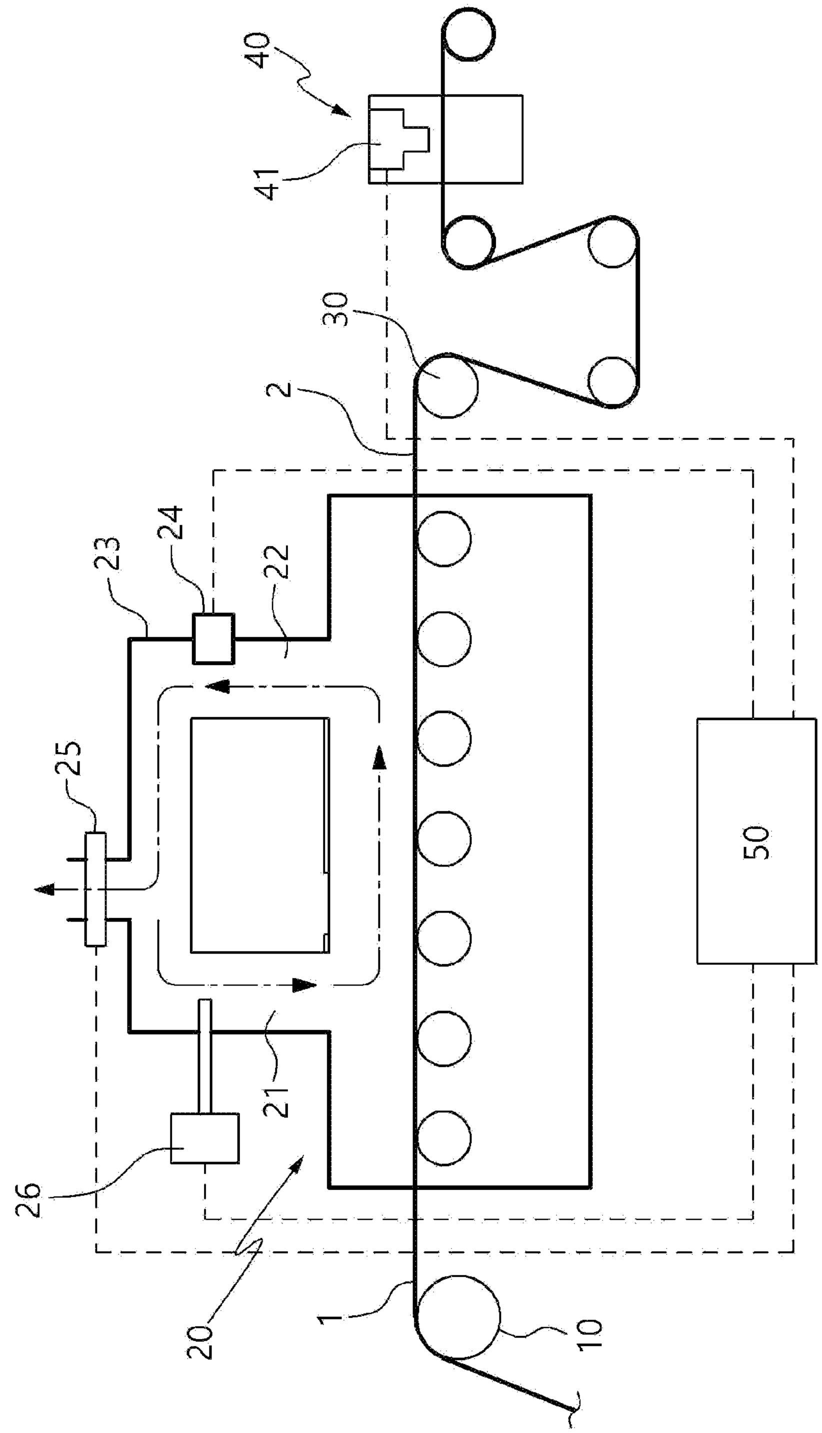

[FIG. 3]
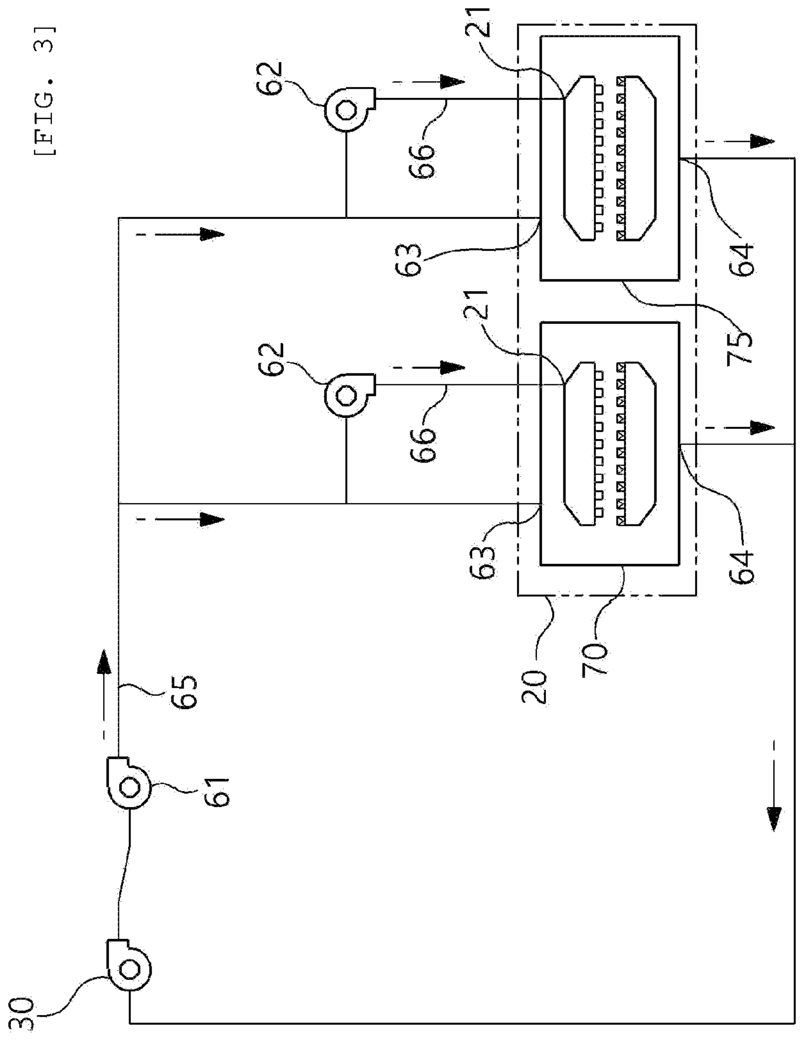
Prior Art

[FIG. 4]
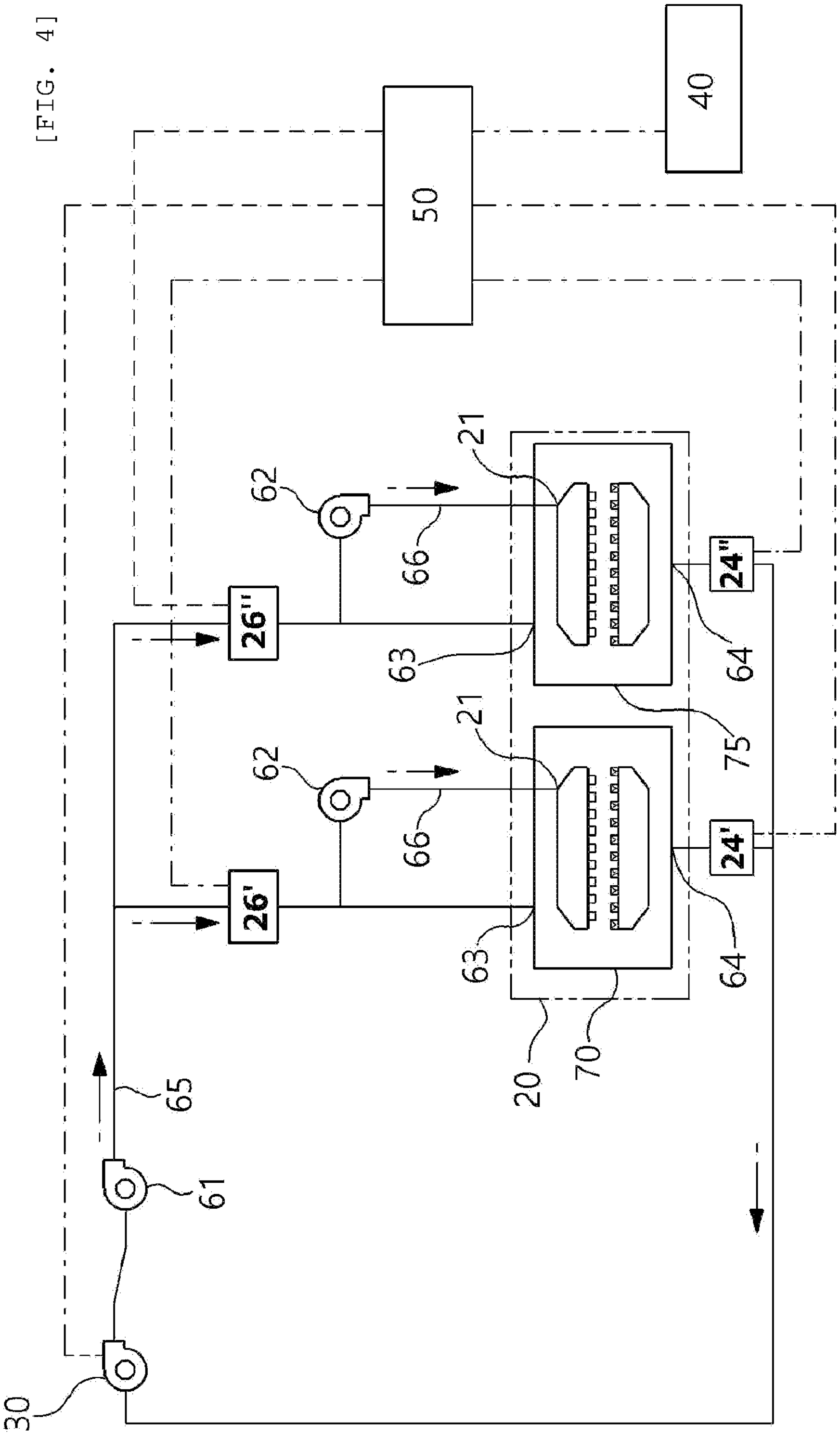

[FIG. 5]
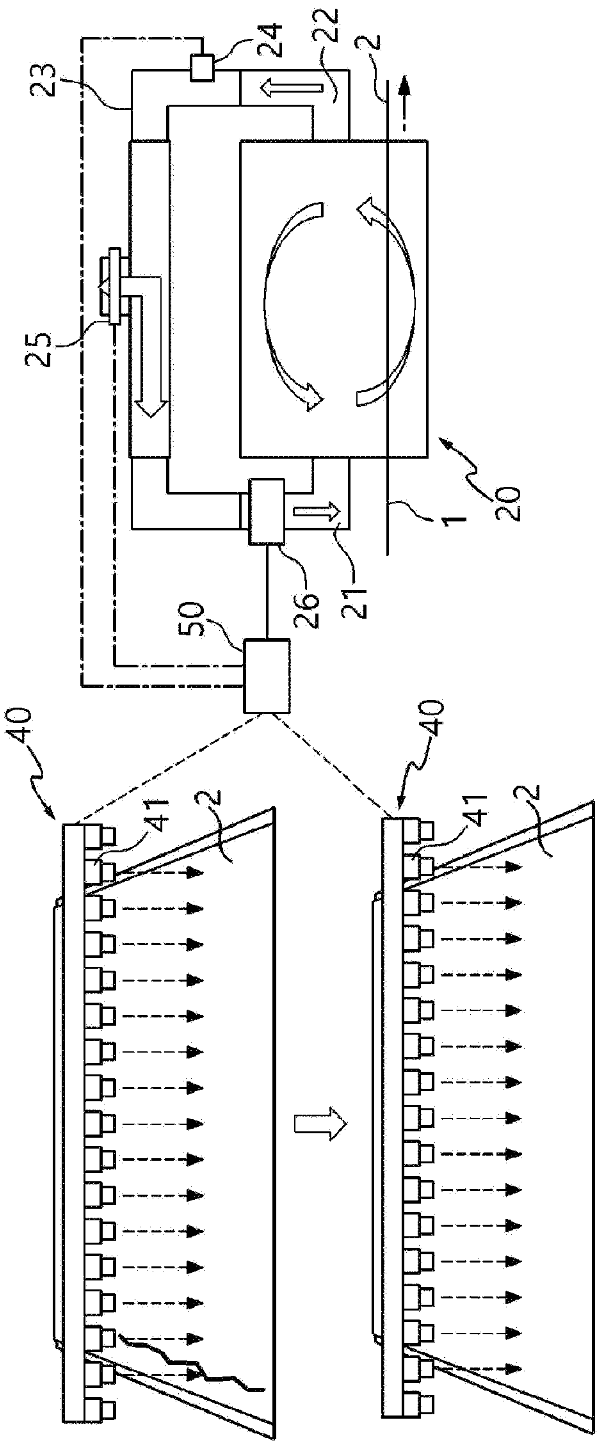

ELECTRODE MANUFACTURING AND DRYING APPARATUS AND METHOD

CROSS-REFERENCE TO RELATED APPLICATIONS

The present application is a national phase entry under 35 U.S.C. § 371 of International Application No. PCT/KR2022/018238 filed on Nov. 17, 2022, which claims the benefit of Korean Patent Application No. 10-2021-0159461 filed with on Nov. 18, 2021, the entire contents of which are incorporated herein by reference.

TECHNICAL FIELD

The present specification relates to an electrode manufacturing apparatus and an electrode manufacturing method.

BACKGROUND ART

Recently, prices of energy sources have increased because of the depletion of fossil fuels, and the interest in environmental pollution is increasing. Therefore, there is an increasing demand for environmental-friendly alternative energy sources. Therefore, research on various power production technologies such as nuclear power, solar power, wind power, and tidal power is being continuously conducted. In addition, interest in power storage devices for more efficiently using the produced energy is high.

In particular, as the development of technologies and demands for mobile devices are increased, there is a rapidly increasing demand for batteries as energy sources. Many studies are being conducted on the batteries in order to meet these needs.

Representatively, regarding a shape of the battery, there is a high demand for an angular or pouch-type secondary battery that may have a small thickness and be applied to products such as mobile phones. Regarding a material, there is a high demand for lithium secondary batteries such as lithium-ion batteries or lithium-ion polymer batteries that have advantages such as a high energy density, a discharge voltage, and output stability.

In general, the secondary battery is structured to include an electrode assembly made by stacking a positive electrode, a negative electrode, and a separator positioned between the positive electrode and the negative electrode. The positive and negative electrodes are each manufactured by applying slurry containing an active material onto a current collector.

A crack is formed in a surface of the dried electrode when the humidity is not suitable for removing a solvent from the applied slurry.

Therefore, there is a need to adjust a condition for drying the slurry to prevent a crack from being formed in the electrode.

DETAILED DESCRIPTION

Technical Problem

The present specification is intended to provide an electrode manufacturing apparatus and an electrode manufacturing method.

Technical Solution

An embodiment of the present specification provides an electrode manufacturing apparatus including: a supply part configured to supply an electrode precursor made by applying electrode slurry onto a substrate; a drying part configured to dry the electrode slurry to manufacture an electrode and including an air supply part configured to supply high-temperature vapor onto the electrode precursor, an air introducing part configured to introduce the supplied high-temperature vapor, a flow path connected from the air introducing part to the air supply part, a sensor configured to measure humidity of the introduced high-temperature vapor, an air discharge part configured to be opened or closed to discharge to the outside a part of the high-temperature vapor that circulates from the air introducing part toward the air supply part along the flow path, and a humidifying part configured to humidify the high-temperature vapor that circulates from the air introducing part toward the air supply part along the flow path; a discharge part configured to discharge the manufactured electrode; a monitoring part configured to monitor the electrode discharged by the discharge part; and a control part configured to collect monitoring information obtained by the monitoring part and information on the humidity measured by the sensor and control whether to open or close the air discharge part and a degree of humidification by the humidifying part.

Another embodiment of the present specification provides an electrode manufacturing method including: supplying an electrode precursor, which is made by applying electrode slurry onto a substrate, into a drying part; drying the electrode slurry to manufacture an electrode while supplying high-temperature vapor to adjust humidity in the drying part; discharging the manufactured electrode from the drying part; monitoring the discharged electrode; and collecting monitoring information obtained by the monitoring of the electrode and information on the humidity in the drying part and controlling the humidity in the drying part.

Advantageous Effects

The electrode manufacturing apparatus and the electrode manufacturing method according to the embodiment of the present specification may control optimal humidity in the drying part on the basis of information obtained by monitoring the dried electrode.

The electrode manufacturing apparatus and the electrode manufacturing method according to another embodiment of the present specification may derive and maintain optimal humidity for the drying target of electrode precursor in accordance with a change in the drying target for the electrode precursor, a change in outside humidity, a change in outside temperature, and the like.

The electrode manufacturing apparatus and the electrode manufacturing method according to still another embodiment of the present specification may derive and maintain optimal humidity for situations of the individual drying lines when the plurality of drying lines is controlled.

BRIEF DESCRIPTION OF DRAWINGS

FIG. 1 is a view illustrating an electrode manufacturing apparatus in the related art.

FIG. 2 is a view illustrating an electrode manufacturing apparatus according to an embodiment of the present specification.

FIG. 3 is a view illustrating an electrode manufacturing apparatus having two drying lines in the related art.

FIG. 4 is a view illustrating an electrode manufacturing apparatus having two drying lines according to another embodiment of the present specification.

FIG. 5 is a view illustrating a series of processes performed when a monitoring part of the embodiment of the present specification detects a crack from an electrode.

EXPLANATION OF REFERENCE NUMERALS AND SYMBOLS

1: Electrode precursor
2: Electrode
10: Supply part
20: Drying part
21: Air supply part
22: Air introducing part
23: Flow path
24, 24', 24": Sensor
25: Air discharge part
26, 26', 26": Humidifying part
30: Discharge part
40: Monitoring part
41: Camera
50: Control part
61: Air supply fan
62: Circulation fan
63: Individual circulation discharge air
64: Entire circulation discharge air
65: Entire circulation supply air
66: Individual mixing supply air
70: First drying part
75: Second drying part
100: Electrode manufacturing apparatus

DETAILED DESCRIPTION

Hereinafter, the present invention will be described in detail with reference to the drawings. However, the drawings are intended to illustratively describe the present invention, and the scope of the present invention is not limited by the drawings.

FIG. 2 is a view illustrating an electrode manufacturing apparatus according to an embodiment of the present specification. The electrode manufacturing apparatus 100 includes a supply part 10, a drying part 20, a discharge part 30, a monitoring part 40, and a control part 50. The electrode manufacturing apparatus 100 including the above-mentioned components may collect monitoring information obtained by the monitoring part 40 and humidity information measured by a sensor and control whether to open or close an air discharge part and a degree of humidification made by the humidifying part.

FIG. 1 is a view illustrating an electrode manufacturing apparatus in the related art. The electrode manufacturing apparatus may receive an electrode precursor 1, which is made by applying electrode slurry onto a substrate, from the supply part 10 and dry the electrode precursor 1 by circulating high-temperature vapor. However, during a process of removing a solvent from the applied electrode slurry, a crack is formed in a surface of the dried electrode because of thermal properties of an electrode solvent and an active material, the amount of heat applied by oven specifications, a drying time according to a coating speed, and an influence of humidity in an oven.

To this end, the electrode manufacturing apparatus may select humidity that is determined to be theoretically or experientially appropriate, and the electrode manufacturing apparatus may maintain humidity in a drying furnace while sensing the humidity. However, because the predetermined humidity may be changed under the circumstances by a change in the drying target for the electrode precursor, a change in outside humidity, a change in outside temperature, and the like, the humidity, which is appropriate to a previous process, may not be suitable for the current process.

In addition, it is difficult to calculate and adjust humidity to be suitable for conditions that often change, and efficiency in calculating and applying the humidity is low.

The electrode manufacturing apparatus and the electrode manufacturing method according to the embodiment of the present specification may control optimal humidity in the drying part by a system on the basis of information obtained by monitoring the dried electrode.

An electrode manufacturing apparatus and an electrode manufacturing method according to another embodiment of the present specification may derive and maintain optimal humidity for the drying target electrode precursor in accordance with a change in drying target electrode precursor, a change in outside humidity, a change in outside temperature, and the like.

The supply part 10 supplies the electrode precursor 1 made by applying the electrode slurry onto the substrate. The way to supply the electrode precursor 1 is not particularly limited as long as the supply part 10 may supply the electrode precursor 1. The electrode precursor 1 may be supplied as the electrode precursor 1 is unwound from a roll around which the electrode precursor 1 is wound. Alternatively, the substrate is unwound from a roll around which the substrate is wound, and a coating part (not illustrated) applies the electrode slurry onto at least one surface of the substrate, such that the coated electrode precursor 1 may be continuously supplied by a conveyance roll.

In this case, the substrate is not particularly limited as long as the substrate may be coated with electrode slurry. The substrate may be a current collector, specifically, a metal foil. The substrate may be a foil made of copper, aluminum, or a combination thereof.

The electrode slurry, which is to be applied by the coater, may include an electrode active material, a binder, and a solvent.

The electrode active material is not particularly limited as long as the electrode active material is a material used for a positive electrode or a negative electrode of a battery. The electrode active material may be selected from electrode active materials used in the technical field.

The binder is not particularly limited as long as the binder may coagulate the electrode active material. The binder may be selected from binders used in the technical field.

The solvent is not particularly limited as long as the solvent may provide fluidity to the electrode slurry. The solvent may be water, N-methyl pyrrolidone, or the like.

The drying part 20 is configured to dry the electrode slurry to manufacture an electrode 2. The drying part 20 may include a heat source and dry the electrode slurry by applying heat. The heat source may include a hot-air blower or a near-infrared heater such as an NIR heater using a filament heating wire, a mid-infrared heater such as an MIR heater using a carbon heating wire, and the like. In this case, the drying temperature may be adjusted in accordance with the electrode slurry and selected within a range of about 50° C. to 300° C. The drying part 20 may be divided and controlled in accordance with the position of the electrode precursor in the drying part 20. The drying part may be divided into a preheating section that is an initial section to which the electrode precursor is supplied, a fixed rate section in which a large amount of evaporation is performed, a lapse rate section provided to perform final drying, and a late cooling section positioned before the electrode precursor is discharged to the outside of the drying part 20. Specifically, in accordance with the position in the drying part 20, the drying temperature is controlled to about 100° C. to 250° C. in the preheating section, about 100° C. to 200° C. in the fixed rate section, about 100° C. to 250° C. in the lapse rate section, and 50° C. to 100° C. in the cooling section.

In this case, high-temperature vapor may be supplied into the drying part 20 to adjust the humidity in a drying device. The electrode manufacturing apparatus may control an atmosphere in the drying part 20 to a predetermined temperature and humidity by supplying high-temperature vapor into the drying part 20, supply the electrode precursor in the drying part 20, dry the electrode precursor by using the heat source, and discharge the electrode, which is the dried electrode precursor, to the outside of the drying part 20.

A temperature of the high-temperature vapor is not particularly limited as long as the temperature of the high-temperature vapor may maintain target absolute humidity without producing condensate water.

The absolute humidity of the high-temperature vapor may control the appropriate absolute humidity suitable for the electrode slurry. Specifically, the absolute humidity of the high-temperature vapor may be 20 $g/m^3$ or more, and more specifically, 20 $g/m^3$ or more and 60 $g/m^3$ or less. Because condensate water may form on the drying part 20 when the absolute humidity becomes too high, the absolute humidity may be controlled in consideration of this situation.

The absolute humidity of the high-temperature vapor may be selected and controlled for each section in accordance with the drying target of the electrode slurry. Specifically, the section may be divided into a low-humidity section of 20 $g/m^3$ or more and 30 $g/m^3$ or less, a middle-humidity section of 30 $g/m^3$ or more and 40 $g/m^3$ or less, a high-humidity section of 40 $g/m^3$ or more and 50 $g/m^3$ or less, and an ultra-high-humidity section of 50 $g/m^3$ or more and 60 $g/m^3$ or less, and the humidity may be controlled to the absolute humidity in the corresponding range. The drying part 20 includes an air supply part 21, an air introducing part 22, a flow path 23, a sensor 24, an air discharge part 25, and a humidifying part 26.

A region is a space in which the electrode precursor 1 is provided from the supply part 10 to be dried by the drying part 20, where the conditions for drying the electrode precursor 1 are adjusted, and the adjusted conditions are maintained. The region may be a drying furnace in which only minimum openings for supplying and discharging are included, i.e., supply and discharge openings are exposed to the outside in case that the electrode precursor 1 is continuously or intermittently supplied to the drying part 20 through a roll-to-roll process and the completely dried electrode 2 is discharged.

In addition to the supply and discharge openings, the drying part 20 may further include openings for supplying and introducing air. This opening is not an opening exposed directly to the outside. An opening may be provided to introduce high-temperature vapor used in the region to be dried, adjust the introduced air to a state of being reusable, and supply and circulate the air.

The air supply part 21 supplies the high-temperature vapor onto the electrode precursor 1. The air supply part 21 may mean a region in which the high-temperature vapor is supplied onto the electrode precursor 1. Specifically, the air supply part 21 may mean a hole through which the high-temperature vapor is supplied onto the electrode precursor 1. In this case, a supply of air made by the air supply part 21 may be naturally generated by the circulation of air. However, particularly, a supply of air may be made by forcibly generating a flow of air by using a fan.

The air introducing part 22 introduces the supplied high-temperature vapor. The air introducing part 22 may mean a region in which the high-temperature vapor supplied onto the electrode precursor 1 is introduced. Specifically, the air introducing part 22 may mean a hole through which the high-temperature vapor supplied onto the electrode precursor 1 is introduced. In this case, the introduction of air made by the air introducing part 22 may be naturally generated by the circulation of air. However, particularly, the introduction of air may be made by forcibly generating a flow of air by using a fan.

The flow path 23 is connected from the air introducing part 22 to the air supply part 21 and defines a route through which the high-temperature vapor introduced into the air introducing part 22 circulates to be supplied back to the air supply part 21. The shape of the flow path 23 is not particularly limited as long as the high-temperature vapor introduced into the air introducing part 22 may be supplied back to the air supply part 21. Particularly, a cross-section of the flow path 23 may be a circular shape.

The sensor 24 measures humidity of the introduced high-temperature vapor. Specifically, the sensor 24 measures absolute humidity of the introduced high-temperature vapor. The absolute humidity is a measure for indicating the amount of moisture vapor contained in the high-temperature vapor and refers to mass of moisture vapor per unit volume. The absolute humidity is not affected by a temperature.

The sensor 24 is not limited to a particular measurement device as long as the sensor 24 may measure the humidity of the introduced high-temperature vapor. One end of the sensor 24 is at least exposed to the inside of a flow path of the air introducing part 22 so that the sensor 24 may measure the humidity of the introduced high-temperature vapor. Information on the humidity of the introduced high-temperature vapor, which is measured as described above, is transmitted, at a predetermined interval or in real time, to the control part 50 to be described below.

The air discharge part 25 is opened or closed to discharge, to the outside, a part of the high-temperature vapor that circulates from the air introducing part 22 toward the air supply part 21 along the flow path 23. Whether to open or close the air discharge part 25 is determined by the control part 50 to be described below. The air discharge part 25 is opened to discharge foreign substances and evaporated solvent in the oven, such that a part of the high-temperature vapor circulating toward the air supply part 21 along the flow path 23 is discharged to the outside. In this case, the vapor, which is supplied to maintain the humidity in the oven, is also discharged. Therefore, a loss of vapor is adjusted by adjusting the amount of vapor to be discharged. The crack, which has been monitored by the monitoring part, is eliminated by adjusting the humidity. In case that the humidity is continuously increased without being maintained because of a delay of time occurring when the humidification made by the humidifying part 26 affects the overall humidity of the vapor in the oven even though the current humidity needs to be maintained, it is possible to stabilize the humidity by increasing the discharge amount by the air discharge part 25. When the humidity increases and exceeds an appropriate humidity condition, the drying of the slurry is hindered, and a preferred drying condition cannot be achieved. Therefore, the humidity condition in which the crack is eliminated is maintained by increasing the discharge amount of air.

The humidifying part 26 humidifies the high-temperature vapor that circulates from the air introducing part 22 toward the air supply part 21 along the flow path 23. The humidifying part 26 is not particularly limited to a humidification device and an installed position as long as the humidifying part 26 may humidify, as necessary, the high-temperature vapor that circulates from the air introducing part 22 toward the air supply part 21 along the flow path 23. An end of the humidifying part 26 capable of supplying moisture is exposed to the inside of the flow path 23 so that the humidifying part 26 may humidify the high-temperature vapor that circulates from the air introducing part 22 toward the air supply part 21 along the flow path 23. Whether to perform the humidification by the humidifying part 26 and a degree of humidification are controlled by the control part to be described below.

A drying temperature and time of the drying part 20 are not particularly limited and may be adjusted in accordance with properties of the electrode slurry that is the drying target.

The discharge part 30 may mean a region in which the manufactured electrode is discharged. The manufactured electrode may be moved by tension applied by a recovery roll that winds and stores the manufactured electrode 2.

The monitoring part 40 monitors the electrode 2 discharged by the discharge part. The monitoring part 40 is positioned between the discharge part 30 and the recovery roll (not illustrated) and monitors the electrode 2 discharged by the discharge part. The monitoring part 40 may include a vision sensing part including a camera 41 configured to detect a crack in the discharged electrode 2. Specifically, the monitoring part 40 may have the camera 41 directed toward a surface of the electrode on which the dried electrode precursor 1 is provided. The monitoring part 40 may include the vision sensing part including an analysis part (not illustrated) configured to analyze information collected by the camera 41. Monitoring information of the monitoring part, which is analyzed as described above, is transmitted, at a predetermined interval or in real time, to the control part 50 to be described below.

The control part 50 collects the monitoring information obtained by the monitoring part 40 and the information on the humidity measured by the sensor and controls the humidity of the high-temperature vapor supplied into the drying part 20. Specifically, the control part 50 controls whether to open or close the air discharge part 25 and the degree of humidification by the humidifying part 26.

The control part 50 may increase the degree of humidification by the humidifying part 26 in order to increase the humidity of the high-temperature vapor. In this case, the humidity may vary depending on the amount of humidification by the humidifying part 26 and the amount of solvent in the electrode determined by the electrode design. Therefore, it is important to use the humidifying part 26 having a sufficient capacity while adjusting the amount of circulating high-temperature vapor.

The control part 50 may close the air discharge part 25 and decrease the amount of vapor to be discharged to the outside in order to increase the humidity of the high-temperature vapor.

The control part 50 may decrease a degree of humidification by the humidifying part 26 or stop the humidification in order to decrease the humidity of the high-temperature vapor.

In addition, to decrease the humidity of the high-temperature vapor, the control part 50 may discharge, to the outside, a part of the high-temperature vapor that circulates from the air introducing part 22 toward the air supply part 21 along the flow path 23.

FIG. 5 is a view illustrating a series of processes performed when the monitoring part 40 of the embodiment of the present specification detects a crack in the completely dried electrode 2.

When the monitoring part 40 detects a crack in the discharged electrode, the control part 50 increases the humidity, which is measured by the sensor 24 when the crack is formed in the discharged electrode, until the crack is not detected in the electrode. When the monitoring part 40 detects no crack in the discharged electrode, the control part 50 determines the humidity, which is measured by the sensor 24 when no crack is detected in the discharged electrode, and the control part 50 performs control to maintain the determined humidity of the high-temperature vapor in the drying part 20.

When the monitoring part 40 detects a crack in the discharged electrode, the control part 50 increases the humidity, which is measured by the sensor 24 when the crack is formed in the discharged electrode, until no crack is detected in the electrode. A predetermined time is required to stabilize the humidity of the overall high-temperature vapor in the drying furnace by the humidification even though the humidification by the humidifying part 26 is increased to increase the humidity of the high-temperature vapor.

The humidifying part 26, which receives an instruction to increase the degree of humidification from the control part 50, increases the humidification, and the increased degree of humidification is reflected, such that a difference between the previous humidity and the humidity to be increased may be 5% or more and 10% or less. A predetermined time is required until the atmosphere in the drying part 20 is stabilized by the increased humidity and the electrode precursor dried in the atmosphere with the increased humidity is discharged. In this case, the predetermined time may be about 5 minutes experientially and increased or decreased depending on the size of the drying furnace. When a crack is detected in the dried electrode even under a changed condition, the control part instructs the humidifying part 26 to increase the degree of humidification once more. This process is repeatedly performed until no crack is detected in the electrode dried and discharged under the changed condition.

When no crack is detected in the electrode dried and discharged under the changed condition, the control part 50 instructs the humidifying part 26 to finally increase the humidity, and the increased target humidity or the increased humidity is stabilized. The control part determines the humidity of the introduced high-temperature vapor measured by the sensor 24 as the humidity at which no crack is detected in the discharged electrode. The determined humidity of the high-temperature vapor in the drying part 20 is controlled to be maintained until no further crack is formed in the electrode during a subsequent process.

FIG. 3 is a view illustrating an electrode manufacturing apparatus having two drying lines in the related art. The air discharged from the two drying lines to the entire circulation discharge air 64 may be mixed, the mixed entirely discharged air may be circulated, and a part of the entire circulating air may be discharged to the outside by the discharge part 30. The entirely circulating air, which is not discharged to the outside by the discharge part 30, and the air introduced from the outside are mixed by an air supply fan 61 and become the entire circulation supply air 65. In addition, individual circulation discharge air 63 may be discharged from the individual drying lines. In this case, the individual circulation discharge air 63 and the entire circulation supply air 65 are mixed and become individual mixing supply air 66 by a circulation fan 62, such that the high-temperature vapor circulates in the individual drying lines.

However, in the related art, the cracks occurring in the individual drying lines cannot be individually controlled.

FIG. 4 is a view illustrating an electrode manufacturing apparatus having two drying lines according to another embodiment of the present specification. Humidifying parts 26' and 26" and sensors 24' and 24" are respectively provided in the individual drying lines, and the control part 50, which collects information from the individual drying lines, individually controls the humidity of the high-temperature vapor in the individual drying lines.

A person skilled in the art may understand that the present invention may be carried out in other specific forms without changing the technical spirit or the essential characteristics of the present invention. Therefore, it should be understood that the above-described embodiments are illustrative in all aspects and do not limit the present invention. The scope of the present invention is represented by the claims rather than the detailed description, and it should be interpreted that the meaning and scope of the claims and various embodiments derived from the equivalent concepts thereto fall within the scope of the present invention.

The invention claimed is:

1. An electrode manufacturing apparatus comprising:

a supply part configured to supply an electrode precursor; the electrode precursor including an electrode slurry disposed on a substrate;

a drying part configured to dry the electrode slurry so as to manufacture an electrode, wherein the drying part includes:

an air supply part disposed within the drying part and configured to supply a high-temperature vapor to the electrode precursor, an air introducing part disposed within the drying part and configured to introduce the high-temperature vapor to a flow path, wherein the flow path is configured to communicate the air introducing part with the air supply part, a sensor configured to measure a humidity of the high-temperature vapor in the flow path, an air discharge part configured to be opened or closed, so as to discharge a part of the high-temperature vapor that circulates from the air introducing part toward the air supply part along the flow path, and a humidifying part configured to humidify the high-temperature vapor that circulates from the air introducing part toward the air supply part along the flow path;

a discharge part configured to discharge the electrode;

a monitoring part configured to monitor the electrode discharged by the discharge part, wherein the monitoring part is disposed after the discharge part; and a control part configured to collect monitoring information obtained by the monitoring part and humidity information measured by the sensor; wherein the control part is configured to control whether to open or close the air discharge part and to control a degree of humidification by the humidifying part.

2. The electrode manufacturing apparatus of claim 1, wherein the monitoring part comprises a vision sensing part having a camera configured to detect a crack in the electrode.

3. The electrode manufacturing apparatus of claim 2, wherein the control part is configured to increase the humidity of the high temperature vapor when the monitoring part detects the crack in the electrode until no crack is detected in the electrode, and wherein the monitoring part is configured to maintain a determined humidity of the high-temperature vapor in the drying part when the monitoring part detects no crack in the electrode, wherein the control part is configured to determine the humidity when no crack is detected in the electrode.

4. An electrode manufacturing method using the electrode manufacturing apparatus of claim 1 comprising:

supplying the electrode precursor, which is made by applying the electrode slurry onto the substrate, into the drying part;

drying the electrode slurry to manufacture the electrode while supplying the high-temperature vapor to adjust the humidity of the high temperature vapor in the drying part;

discharging the electrode from the drying part;

monitoring the electrode; and collecting the monitoring information obtained by the monitoring of the electrode and collecting the humidity information of the high temperature vapor in the drying part and controlling the humidity in the drying part.

5. The electrode manufacturing method of claim 4, wherein the monitoring of the electrode comprises detecting a crack in the electrode by using a camera configured to capture an image of a surface of the electrode after the electrode is discharged from the drying part.

6. The electrode manufacturing method of claim 4, wherein the controlling of the humidity in the drying part comprises:

increasing the humidity in the drying part when a crack is formed in the electrode until no crack is detected in the electrode by the monitoring of the electrode; and determining a humidity at which no crack is detected in the electrode and controlling the humidity in the drying part to maintain the humidity so as to match the humidity at which no crack is detected in the electrode.

* * * * *